(12) United States Patent
Shibaike et al.

(10) Patent No.: US 12,395,299 B2
(45) Date of Patent: Aug. 19, 2025

(54) TERMINAL

(71) Applicant: NTT DOCOMO, INC., Tokyo (JP)

(72) Inventors: Naoya Shibaike, Tokyo (JP); Hiroki Harada, Tokyo (JP); Satoshi Nagata, Tokyo (JP); Xin Wang, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 386 days.

(21) Appl. No.: 17/920,521

(22) PCT Filed: Apr. 22, 2020

(86) PCT No.: PCT/JP2020/017407
§ 371 (c)(1),
(2) Date: Oct. 21, 2022

(87) PCT Pub. No.: WO2021/214920
PCT Pub. Date: Oct. 28, 2021

(65) Prior Publication Data
US 2023/0163915 A1 May 25, 2023

(51) Int. Cl.
H04L 5/00 (2006.01)
H04J 13/00 (2011.01)
H04L 27/26 (2006.01)
H04W 72/04 (2023.01)
H04W 88/02 (2009.01)

(52) U.S. Cl.
CPC ........ *H04L 5/0051* (2013.01); *H04J 13/0062* (2013.01); *H04L 27/26025* (2021.01)

(58) Field of Classification Search
CPC .............. H04L 5/0051; H04L 27/26025; H04J 13/0062
USPC .......................................... 370/329
See application file for complete search history.

(56) References Cited

U.S. PATENT DOCUMENTS

| | | | |
|---|---|---|---|
| 2019/0327058 A1* | 10/2019 | Jiang | H04L 27/26 |
| 2020/0412515 A1* | 12/2020 | Xu | H04W 4/70 |
| 2021/0281374 A1* | 9/2021 | Kim | H04J 13/0048 |
| 2021/0320772 A1* | 10/2021 | Zewail | H04L 5/0051 |
| 2021/0337548 A1* | 10/2021 | Gao | H04L 5/0023 |
| 2023/0101410 A1* | 3/2023 | Cheng | H04L 27/26025 375/262 |

OTHER PUBLICATIONS

International Search Report issued in PCT/JP2020/017407 on Nov. 17, 2020 (1 page).
Written Opinion of the International Searching Authority issued in PCT/JP2020/017407 on Nov. 17, 2020 (3 pages).

(Continued)

*Primary Examiner* — Xuan Lu
(74) *Attorney, Agent, or Firm* — Osha Bergman Watanabe & Burton LLP

(57) ABSTRACT

A terminal receives a demodulation reference signal from a network. The terminal assumes the demodulation reference signal to be more aggregated in a frequency direction than in a case where a frequency band including one or a plurality of frequency ranges is used, when a different frequency band differing from the frequency band is used or when a wider subcarrier spacing is applied than the case where the frequency band is used.

4 Claims, 16 Drawing Sheets

(56) References Cited

OTHER PUBLICATIONS

InterDigital Inc.; "On Demodulation Reference Signal for Non-orthogonal Multiple Access"; 3GPP TSG RAN WG1 Meeting #93, R1-1807030; Busan, South Korea; May 21-25, 2018 (5 pages).
Samsung; "DMRS Collision Avoidance for multiplexing of eMBB and URLLC"; 3GPP TSG RAN WG1 NR Meeting #88bis, R1-1705408; Spokane, USA; Apr. 3-7, 2017 (4 pages).
ETRI; "Discussion on DMRS design for data channel"; 3GPP TSG RAN WG1 Meeting #88bis, R1-1704946; Spokane, USA; Apr. 3-7, 2017 (8 pages).
Qualcomm; "New WID on Extending current NR operation to 71 Ghz"; 3GPP TSG RAN Meeting #86, RP-193229; Sitges, Spain; Dec. 9-12, 2019 (20 pages).

\* cited by examiner

Type 1 (Comb 2 + 2 CS + TD-OCC)

Type 2 (FD-OCC + adjacent REs + TD-OCC)

FIG. 10
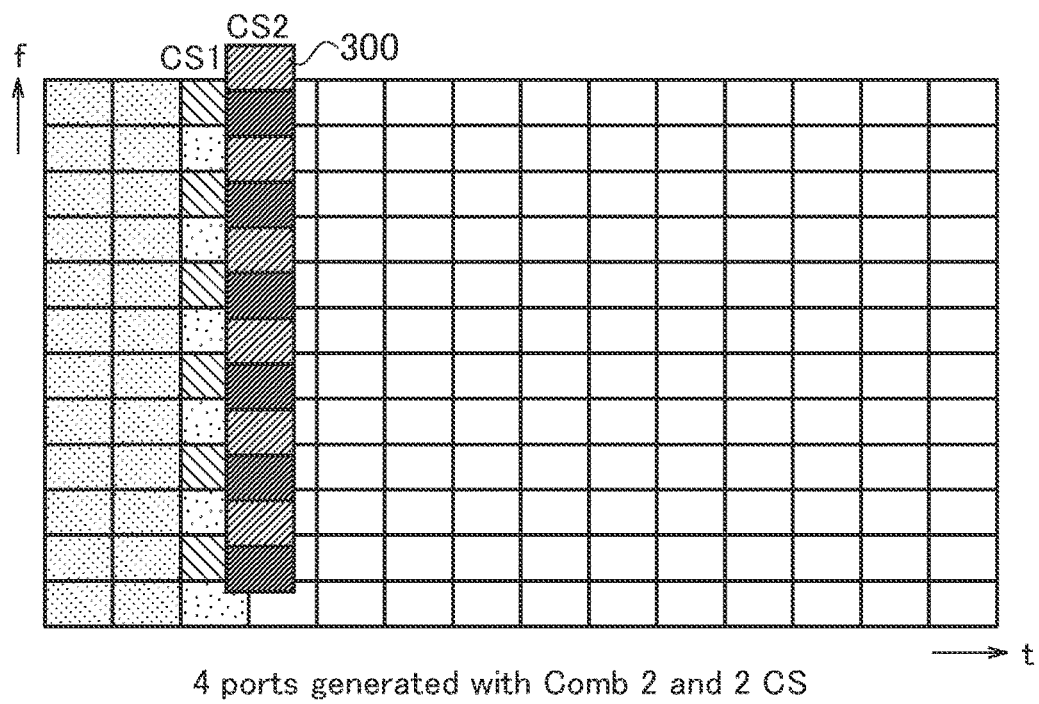
4 ports generated with Comb 2 and 2 CS
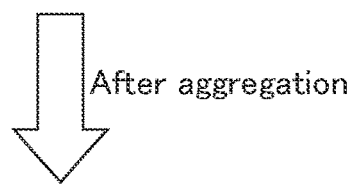
After aggregation
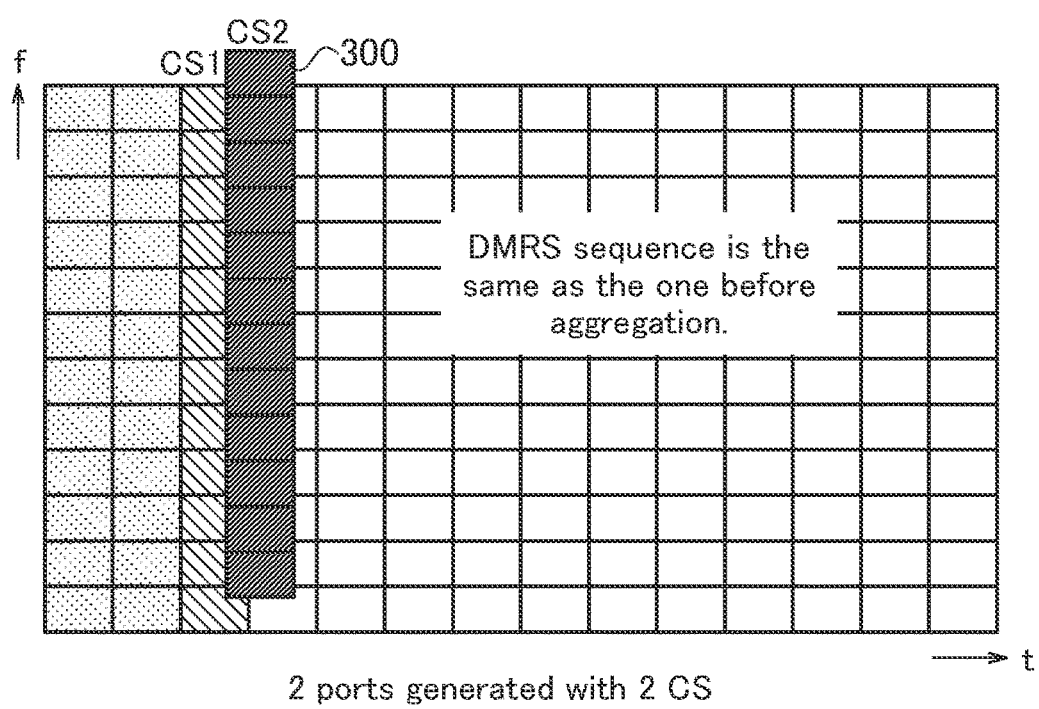
2 ports generated with 2 CS

FIG. 12
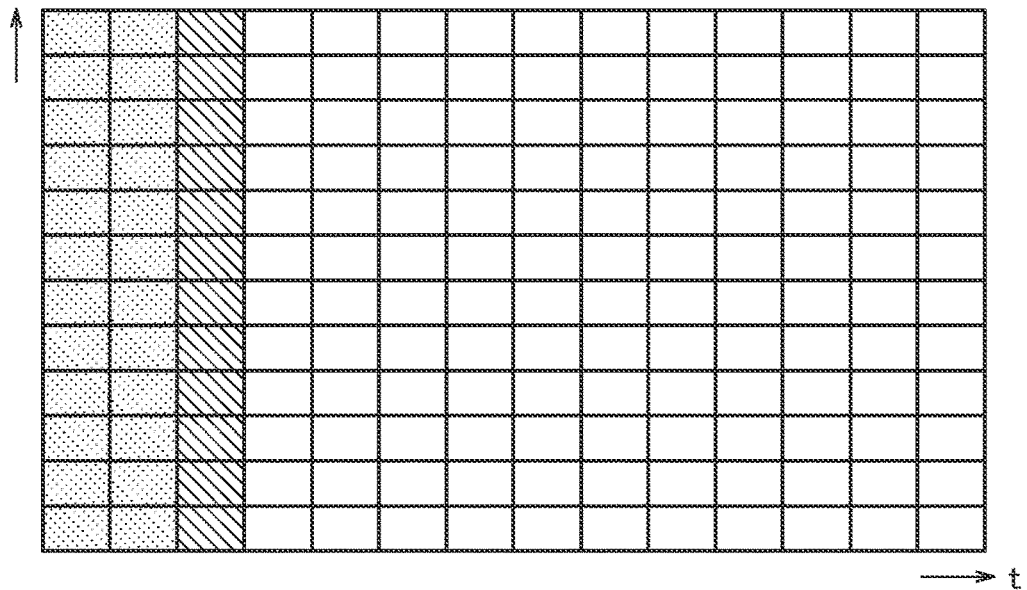
Port 1000: CS1, wf(k')=[+1, +1]
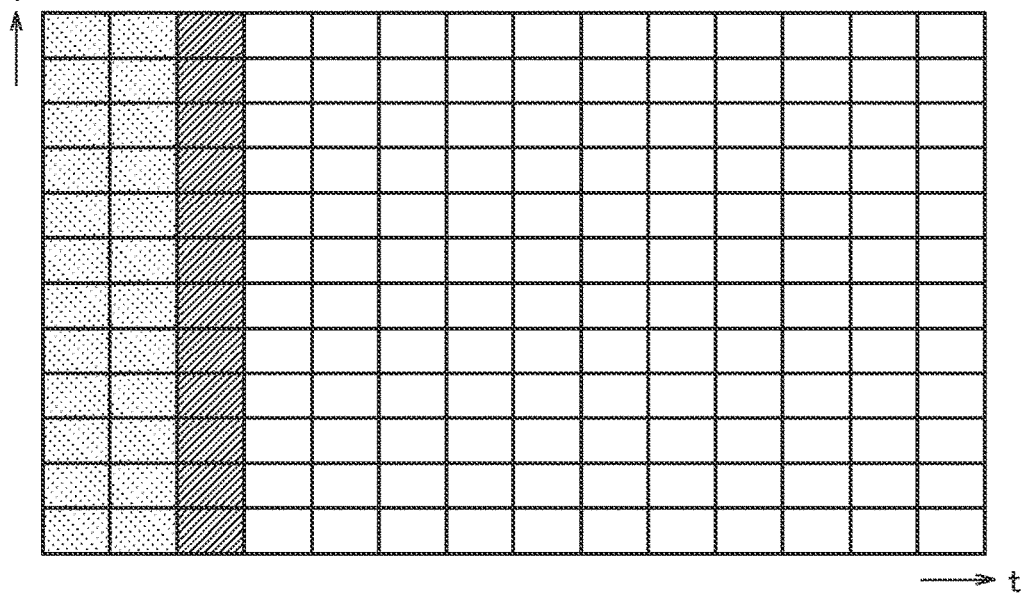
Port 1001: CS2, wf(k')=[+1, −1]

FIG. 13
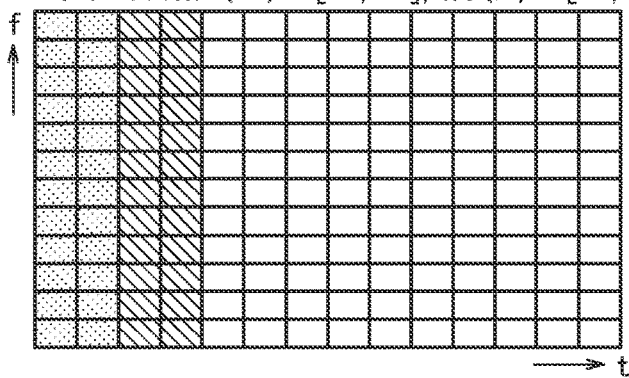
Port 1000:wf (k') = [+1, +1], wt (l') = [+1, +1]
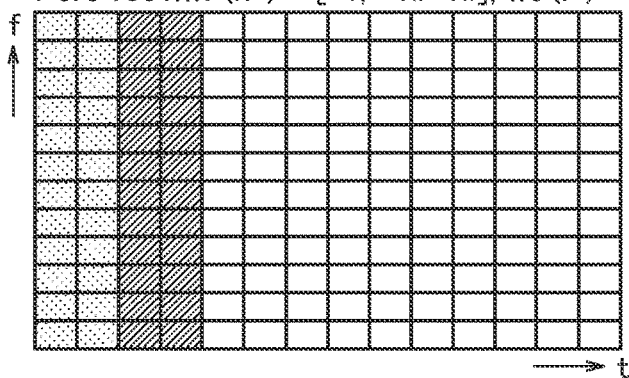
Port 1001:wf (k') = [+1, −1#+1#], wt (l') = [+1, +1]
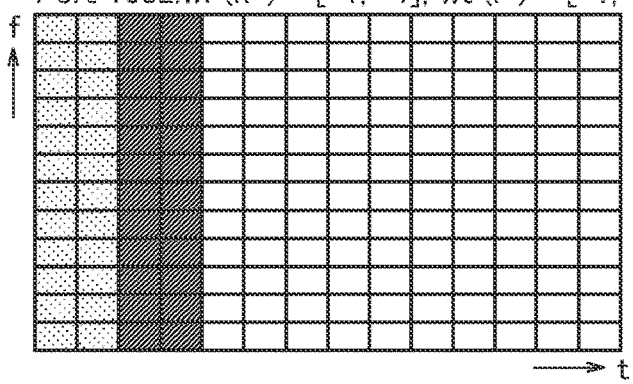
Port 1002:wf (k') = [+1, +1], wt (l') = [+1, −1#+1#]
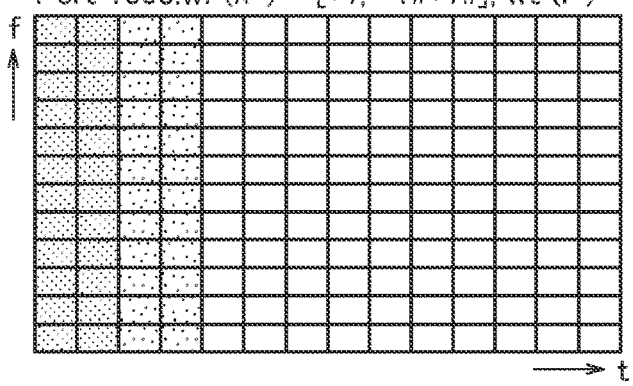
Port 1003:wf (k') = [+1, −1#+1#], wt (l') = [+1, −1#+1#]

Truncated ZC

Down Sampled ZC

TERMINAL

TECHNICAL FIELD

The present disclosure relates to a terminal that performs radio communications, and particularly relates to a terminal that receive a reference signal from a network.

BACKGROUND ART

The 3rd Generation Partnership Project (3GPP) has drafted the specifications of the 5th generation mobile communication system (5G, also known as New Radio (NR) or Next Generation (NG)), and is further drafting the next generation standard known as Beyond 5G, 5G Evolution, or 6G.

In 3GPP Release 15 and Release 16 (NR), the specifications of operations in a plurality of frequency ranges are drafted. Specifically, the frequency ranges include bands such as FR1 (410 MHz to 7.125 GHZ) and FR2 (24.25 GHZ to 52.6 GHZ).

Furthermore, NR supporting frequencies exceeding 52.6 GHz and reaching up to 71 GHz is under study (Non Patent Literature 1). Beyond 5G, 5G Evolution, or 6G (Release 18 or later versions) are further expected to support frequency bands above 71 GHZ.

CITATION LIST

Non Patent Literature

Non Patent Literature 1: "New WID on Extending current NR operation to 71 GHz", RP-193229, 3GPP TSG RAN Meeting #86, 3GPP, December 2019

SUMMARY OF INVENTION

Technical Problem

When a frequency band different from FR1 and FR2, such as a high frequency band exceeding 52.6 GHz is used, a larger (wider) subcarrier carrier spacing (SCS) is assumed to be used for purposes such as supporting stable radio communications during high speed movement of a terminal (User Equipment, UE).

Such a large SCS (may also be interpreted as a resource block (RB)) may be equivalent to a channel coherent bandwidth with flat frequency response. Furthermore, a larger SCS is required to achieve a longer channel coherent time with flat characteristics in a time direction.

A demodulation reference signal (DMRS) includes two types (Types 1 and 2) and requires satisfaction of a condition that flat frequency response is obtained over a bandwidth occupied by two or three consecutive subcarriers. Unfortunately, a wide SCS may fail to satisfy this condition.

Thus, a DMRS design may be modified but preferably without departing from the DMRS design corresponding to SCS for existing frequency bands, such as FR1 and FR2 as much as possible.

The disclosure described below is made in view of the above situation, and an object of the disclosure is to provide a terminal that can receive a demodulation reference signal (DMRS) that supports a large subcarrier spacing (SCS) due to the use of a high-frequency band exceeding 52.6 GHz or the like while having commonality with DMRSs supporting SCSs for existing frequency bands.

One aspect of the present disclosure is a terminal (UE 200) comprising: a reception unit (control signal/reference signal processing unit 240) configured to receive a demodulation reference signal from a network; and a control unit (control unit 270) configured to assume the demodulation reference signal to be more aggregated in a frequency direction than in a case where a frequency band including one or a plurality of frequency ranges is used, when a different frequency band differing from the frequency band is used, or when a wider subcarrier spacing is applied than the case where the frequency band is used.

One aspect of the present disclosure is a terminal (UE 200) comprising: a reception unit (control signal/reference signal processing unit 240) configured to receive a demodulation reference signal from a network; and a control unit (control unit 270) configured to assume the demodulation reference signal to include a first portion and a second portion dispersed at a plurality of positions in a time direction, when a different frequency band differing from a frequency band including one or a plurality of frequency ranges is used, or when a wider subcarrier spacing is applied than the case where the frequency band is used. The control unit assumes a same position of the first portion and the second portion in a frequency direction to be associated with different ports.

One aspect of the present disclosure is a terminal (UE 200) comprising: a reception unit (control signal/reference signal processing unit 240) configured to receive a demodulation reference signal from a network; and a control unit (control unit 270) configured to assume the demodulation reference signal having at least a part for which a Zadoff-Chu sequence is used, when a different frequency band differing from a frequency band including one or a plurality of frequency ranges is used or when a wider subcarrier spacing is applied than the case where the frequency band is used. The control unit assumes different ports to be alternately associated in a resource block allocated with the demodulation reference signal for which the Zadoff-Chu sequence is used.

BRIEF DESCRIPTION OF DRAWINGS

FIG. 10 is a diagram illustrating a configuration example of DMRS aggregation according to Operation Example 1.

FIG. 12 is a diagram illustrating details of the DMRS pattern illustrated in FIG. 11A.

FIG. 13 is a diagram illustrating details of the DMRS pattern illustrated in FIG. 11B.

DESCRIPTION OF EMBODIMENTS

Figure 1:
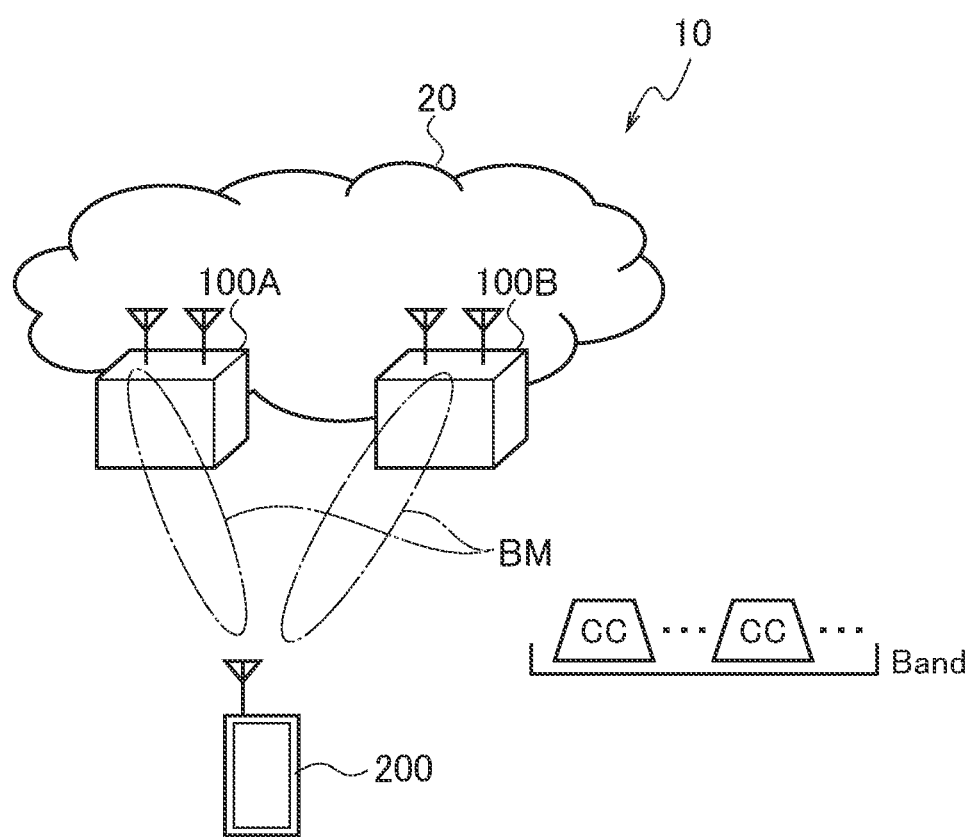
FIG. 1 is a diagram illustrating an overall schematic configuration of a radio communication system 10.

Embodiments will be described below with reference to the drawings. The same functions and configurations are denoted by the same or similar reference numerals, and description thereof will be omitted as appropriate.

(1) Overall Schematic Configuration of Radio Communication System

FIG. 1 is a diagram illustrating an overall schematic configuration of a radio communication system 10 according to the present embodiment. The radio communication system 10 is a radio communication system compatible with 5G New Radio (NR), and includes a Next Generation-Radio Access Network 20 (hereinafter, NG-RAN 20) and a terminal 200 (hereinafter, UE 200, User Equipment).

The radio communication system 10 may be a radio communication system compatible with a system known as Beyond 5G, 5G Evolution or 6G.

The NG-RAN 20 includes a radio base station 100A (hereinafter, a gNB 100A) and a radio base station 100B (hereinafter, a gNB 100B). Note that the specific configuration of the radio communication system 10, including the number of gNBs and the number of and UEs, is not limited to the example illustrated in FIG. 1.

The NG-RAN 20 actually includes a plurality of NG-RAN Nodes, specifically, gNBs (or ng-eNBs), and is connected to a core network compatible with 5G (5GC, not illustrated). Note that the NG-RAN 20 and 5GC may be simply referred to as "network".

The gNB 100A and the gNB 100B are radio base stations compatible with 5G, and perform 5G radio communications with the UE 200. With radio signals transmitted from a plurality of antenna elements controlled, the gNB 100A, the gNB 100B, and the UE 200 may support Massive Multiple-Input Multiple-Output (MIMO) that generates a beam BM with a higher directivity, carrier aggregation (CA) that aggregates to use a plurality of component carriers (CCs), dual connectivity (DC) enabling the UE to concurrently communicate with the two NG-RAN Nodes, and the like.

Figure 2:
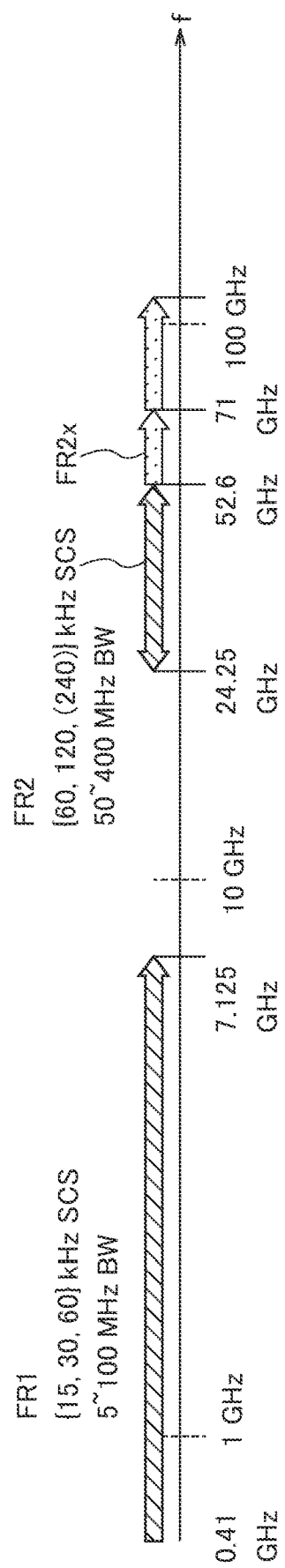
FIG. 2 is a diagram illustrating frequency ranges used in the radio communication system 10.

Furthermore, the radio communication system 10 supports a plurality of frequency ranges (FR). FIG. 2 illustrates frequency ranges used in the radio communication system 10.

As illustrated in FIG. 2, the radio communication system 10 supports FR1 and FR2. The frequency band of each FR is as follows.

FR1: 410 MHz to 7.125 GHZ
FR2: 24.25 GHz to 52.6 GHz

For FR1, Sub-Carrier Spacing (SCS) of 15, 30 or 60 kHz, and a bandwidth (BW) of 5 to 100 MHZ may be used. For FR2 which is a range of frequencies higher than FR1, an SCS of 60 or 120 kHz (may include 240 kHz) and a bandwidth (BW) of 50 to 400 MHz may be used.

Note that SCS may be interpreted as numerology. The numerology is defined in 3GPP TS38.300 and corresponds to one subcarrier spacing in a frequency domain.

Furthermore, the radio communication system 10 also supports a frequency band higher than FR2. Specifically, the radio communication system 10 supports a frequency band exceeding 52.6 GHz and reaching up to 71 GHZ. For convenience sake, such a high frequency band may be referred to as "FR2x".

When a band exceeding 52.6 GHz is used to solve the problem described above, Cyclic Prefix-Orthogonal Frequency Division Multiplexing (CP-OFDM)/Discrete Fourier Transform-Spread (DFT-S-OFDM) involving a larger SCS may be employed.

Figure 3:
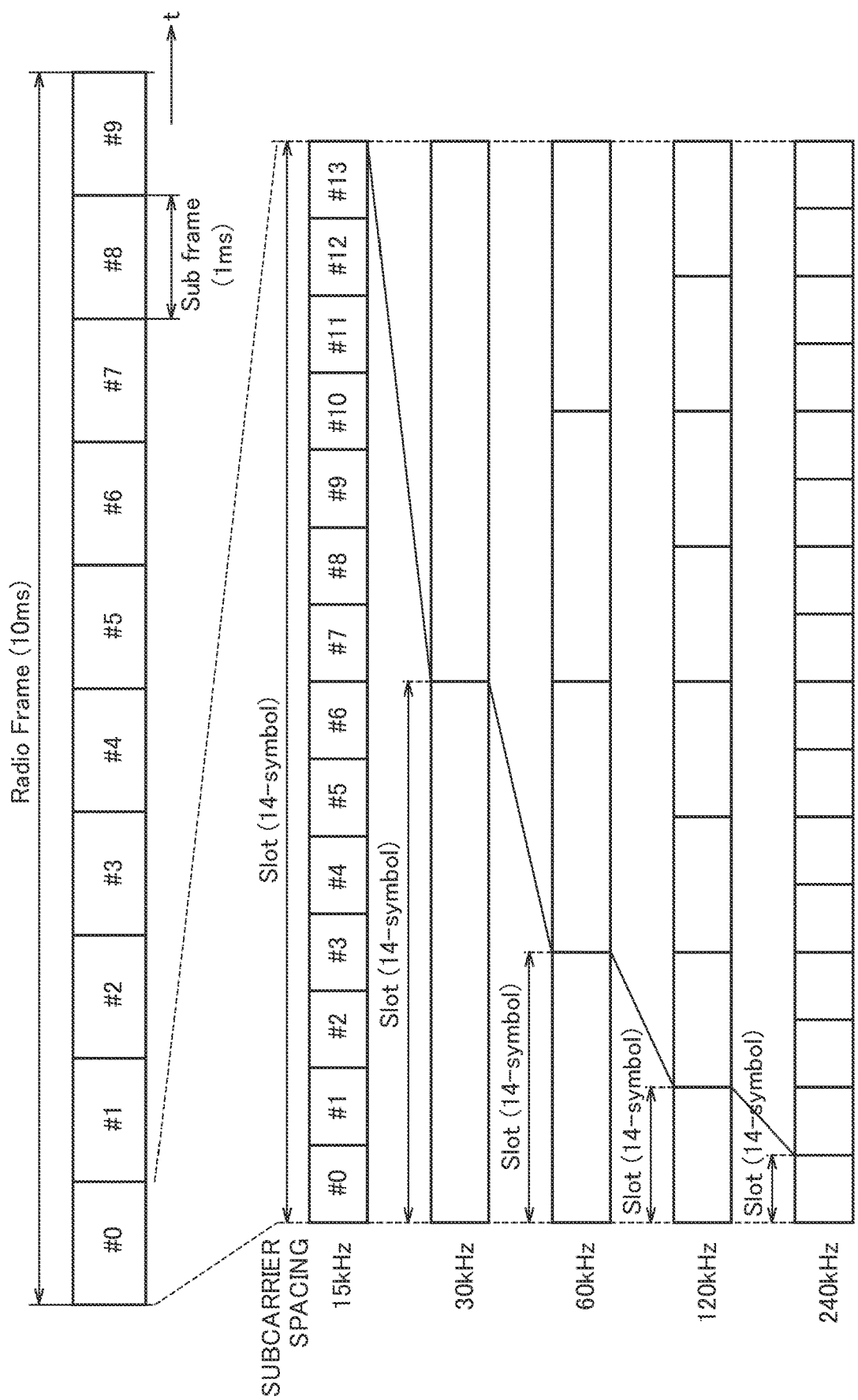
FIG. 3 is a diagram illustrating a configuration example of a radio frame, a subframe, and a slot used in the radio communication system 10.

FIG. 3 illustrates an example of a configuration of a radio frame, a subframe, and a slot used in the radio communication system 10.

As illustrated in FIG. 3, one slot includes 14 symbols, and a symbol period (as well as a slot period) decreases as the SCS increases (widens). The SCS is not limited to the spaces (frequencies) illustrated in FIG. 3. For example, the SCS may be 480 kHz, 960 kHz, or the like.

A time direction (t) illustrated in FIG. 3 may also be referred to as a time domain, a symbol period, a symbol time, or the like. Further, a frequency direction may also be referred to as a frequency domain, a resource block, a subcarrier, a bandwidth part (BWP), or the like.

Furthermore, in the radio communication system 10, a plurality of reference signals (RS) may be used. Types of RS, which will be described later, in the present embodiment, the configuration of a demodulation reference signal (DMRS) may be different from that specified in 3GPP Release-15 and Release-16.

The DMRS is one type of reference signal and is prepared for various channels. Here, unless otherwise specified, the DMRS may be regarded as a DMRS for a downlink data channel, which is specifically a Physical Downlink Shared Channel (PDSCH). However, a DMRS for an uplink data channel, which is specifically a Physical Uplink Shared Channel (PUSCH), may be regarded as being similar to the DMRS for the PDSCH.

The DMRS may be used for channel estimation as a part of coherent demodulation, in a device, for example, the UE 200. The DMRS may be included only in a resource block (RB) used for PDSCH transmission.

There may be a plurality of mapping types for DMRS. Specifically, a mapping type A and a mapping type B may be used for the DMRS. In the mapping type A, the first DMRS is mapped to the second or the third symbol of the slot. In the mapping type A, the DMRS may be mapped based on a slot boundary regardless of where in the slot the actual data transmission begins. It can be regarded that the first DMRS is mapped to the second or the third symbol of the slot in order to map the first DMRS to follow control resource sets (CORESET).

In the mapping type B, the first DMRS may be mapped to the first symbol of the data allocation. This means that the DMRS may be relatively positioned with respect to a location provided with data instead of being positioned based on the slot boundary.

The DMRS may include a plurality of types.

Specifically, the DMRS includes Type 1 and Type 2. Type 1 and Type 2 are different from each other in the mapping in the frequency domain and the maximum number of orthogonal reference signals. Type 1 can output up to four orthogonal signals with a single-symbol DMRS, and Type 2 can output up to eight orthogonal signals with a double-symbol DMRS.

(2) Functional Block Configuration of Radio Communication System

Next, a functional block configuration of the radio communication system 10 will be described. Specifically, a functional block configuration of the UE 200 will be described.

Figure 4:
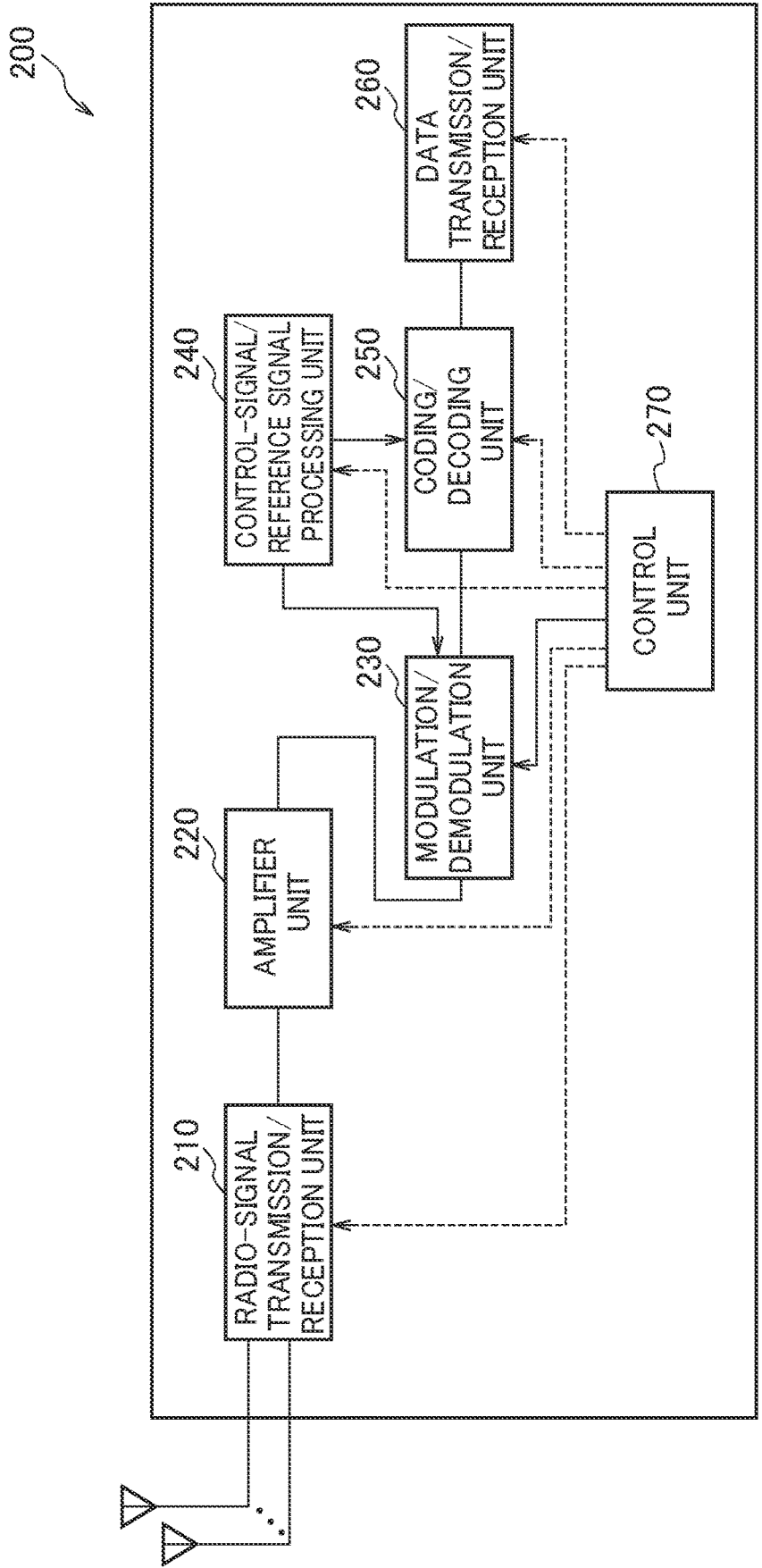
FIG. 4 is a diagram illustrating a functional block configuration of a UE 200.

FIG. 4 is a diagram illustrating a functional block configuration of the UE 200. As illustrated in FIG. 4, the UE 200 includes a radio signal transmission/reception unit 210, an amplifier unit 220, a modulation/demodulation unit 230, a control signal/reference signal processing unit 240, a coding/decoding unit 250, a data transmission/reception unit 260, and a control unit 270.

The radio signal transmission/reception unit 210 transmits/receives a radio signal according to NR. The radio signal transmission/reception unit 210 supports Massive MIMO, CA that aggregates a plurality of CCs to be used, DC enabling the UE to concurrently communicate with two NG-RAN, and the like.

The amplifier unit 220 includes a power amplifier (PA)/Low Noise Amplifier (LNA) and the like. The amplifier unit 220 amplifies the signal output from the modulation/demodulation unit 230 to a predetermined power level. Furthermore, the amplifier unit 220 amplifies the RF signal output from the radio signal transmission/reception unit 210.

The modulation/demodulation unit 230 executes data modulation/demodulation, transmission power setting, resource block allocation, and the like for each predetermined communication destination (such as the gNB 100A). The modulation/demodulation unit 230 may apply Cyclic Prefix-Orthogonal Frequency Division Multiplexing (CP-OFDM)/Discrete Fourier Transform-Spread (DFT-S-OFDM). DFT-S-OFDM may be applied not only for the uplink (UL) but may also be applied for the downlink (DL).

The control signal/reference signal processing unit 240 executes processing related to various control signals transmitted and received by the UE 200 and processing related to various reference signals transmitted and received by the UE 200.

Specifically, the control signal/reference signal processing unit 240 receives various control signals transmitted from the gNB 100A via a predetermined control channel, for example, a control signal of the radio resource control layer (RRC). The control signal/reference signal processing unit 240 also transmits various control signals to the gNB 100A via a predetermined control channel.

The control signal/reference signal processing unit 240 executes processing using a reference signal (RS) such as a Demodulation Reference Signal (DMRS) and a Phase Tracking Reference signal (PTRS).

The DMRS is a reference signal (pilot signal) known between a terminal and a terminal-specific base station, and is used for estimating a fading channel used for data demodulation. The PTRS is a terminal-specific reference signal used for estimating phase noise, which becomes a problem in high frequency bands.

The reference signal may include Channel State Information-Reference Signal (CSI-RS), Sounding Reference Signal (SRS), and Positioning Reference Signal (PRS) for position information, in addition to the DMRS and the PTRS.

Furthermore, the channel includes a control channel and a data channel. The control channel includes a Physical Downlink Control Channel (PDCCH), a Physical Uplink Control Channel (PUCCH), a Random Access Channel (RACH), Downlink Control Information (DCI) including Random Access Radio Network Temporary Identifier (RA-RNTI)), Physical Broadcast Channel (PBCH), and the like.

The data channel includes a Physical Downlink Shared Channel (PDSCH), a Physical Uplink Shared Channel (PUSCH), and the like. Data may mean data transmitted over a data channel.

In the present embodiment, the control signal/reference signal processing unit 240 forms a reception unit that receives the demodulation reference signal (DMRS) from a network, specifically, the NG-RAN 20.

As described above, the DMRS may be transmitted from the NG-RAN 20 (more specifically, from the gNB 100A or the like) using a specific symbol in a slot.

The control signal/reference signal processing unit 240 may receive a plurality of types of DMRS from the network. Specifically, the control signal/reference signal processing unit 240 can receive the DMRS of Type 1 or Type 2.

More specifically, the control signal/reference signal processing unit 240 can receive a single-symbol or a double-symbol DMRS from the network.

Figure 5A:
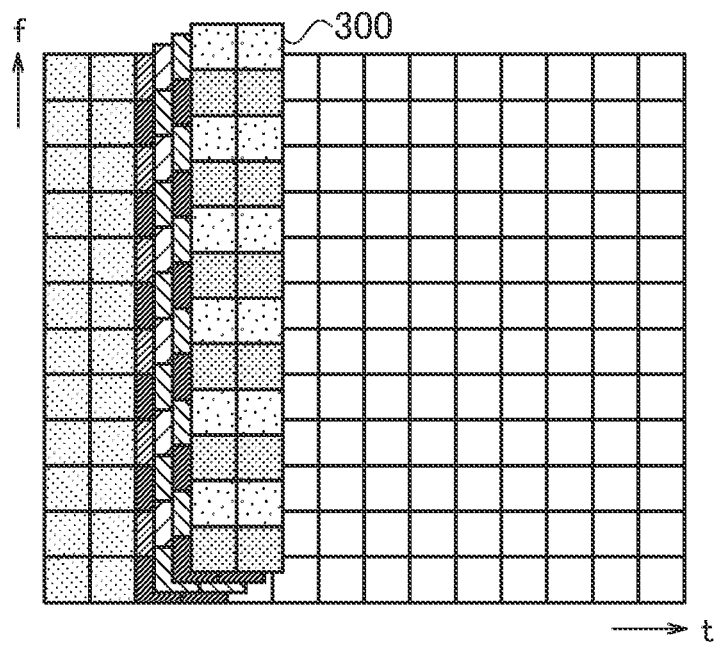
FIG. 5A is a diagram illustrating DMRS Configuration Example 1 (Type 1, FD Comb 2+2 CS+TD-OCC).
Figure 5B:
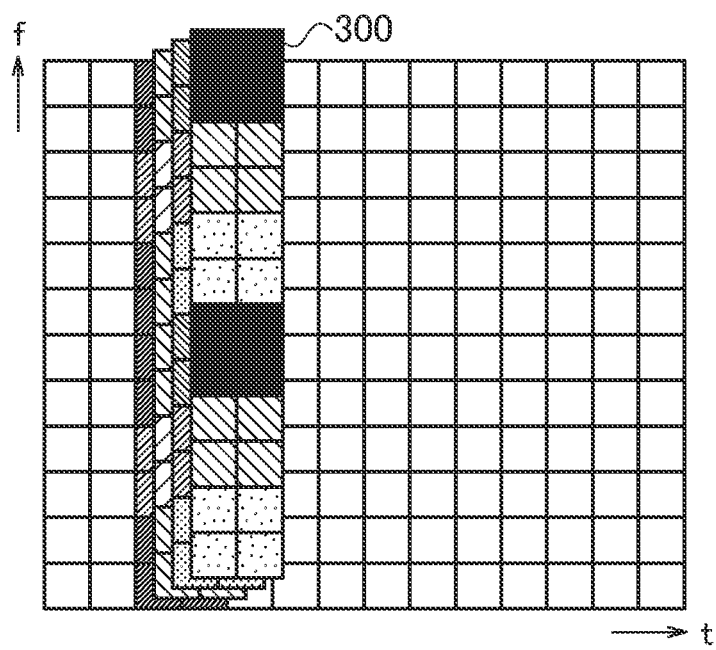
FIG. 5B is a diagram illustrating DMRS Configuration Example 2 (Type 2, FD OCC+TD-OCC+FDM).

FIG. 5A, FIG. 5B, FIG. 6A and FIG. 6B illustrate examples of a configuration of the DMRS. Specifically, FIG. 5A illustrates DMRS Configuration Example 1 (Type 1, FD Comb 2+2 CS+TD-OCC), and FIG. 5B illustrates DMRS Configuration Example 2 (Type 2, FD OCC+TD-OCC+FDM).

Figure 6A:
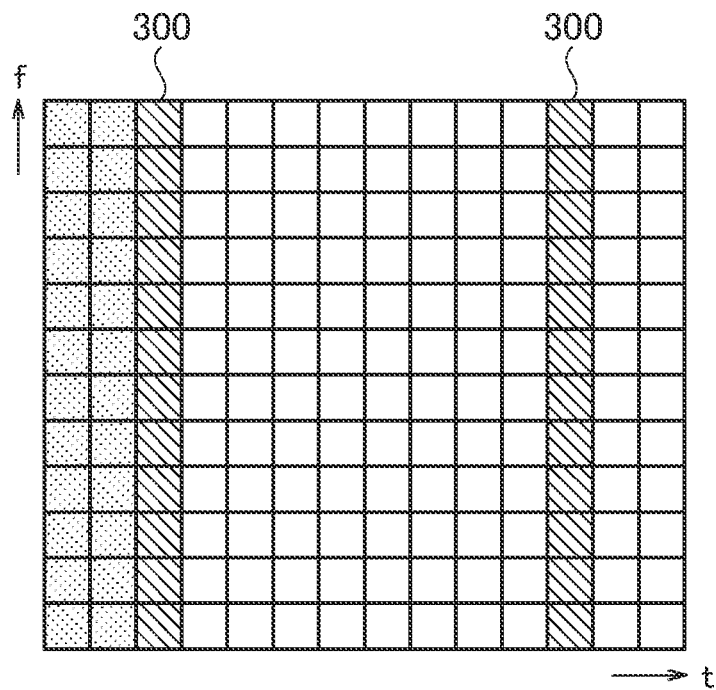
FIG. 6A is a diagram illustrating DMRS Configuration Example 3.
Figure 6B:
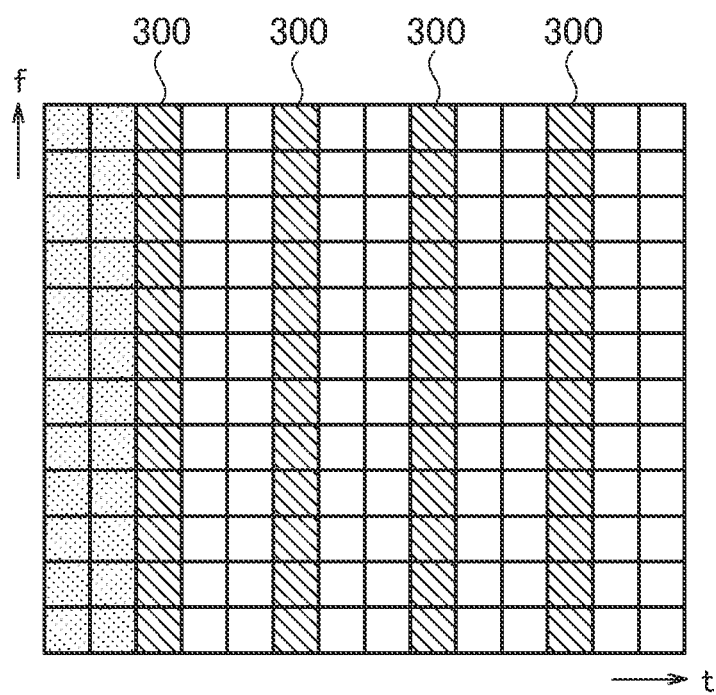
FIG. 6B is a diagram illustrating DMRS Configuration Example 4.

FIGS. 6A and 6B illustrate DMRS Configuration Examples 3 and 4. Configuration Example 1 and Configuration Example 2 are what are known as front-loaded DMRS with a DMRS sequence 300 mapped to a front symbol in the slot. In Configuration Example 1 and Configuration Example 2, the sequence 300 is multiplexed in the spatial direction, specifically, using a plurality of ports. The port may mean a gNB port, specifically, an antenna port.

In Configuration Example 3 and Configuration Example 4 the sequences 300 is added to be dispersed in the time domain in the slot. The sequence 300 to be added may include one to three sequences added in the time direction as illustrated in Configuration Examples 3 and 4.

Configuration Example 3 and Configuration Example 4 are examples of mapping type A for the PDSCH. The details of each Configuration Example will be described later.

The coding/decoding unit 250 executes data division/combination, channel coding/decoding, and the like for each predetermined communication destination (the gNB 100A or another gNB).

Specifically, the coding/decoding unit 250 divides the data output from data transmission/reception unit 260 into data pieces of a predetermined size, and executes channel coding on the divided data pieces. Furthermore, the coding/decoding unit 250 decodes the data output from the modulation/demodulation unit 230 and combines pieces of the decoded data.

The data transmission/reception unit 260 transmits and receives a Protocol Data Unit (PDU) and a Service Data Unit (SDU). Specifically, the data transmission/reception unit 260 performs assembling/disassembling of PDU/SDU in a plurality of layers (such as a media access control (MAC) layer, a radio link control (RLC) layer, and a packet data convergence protocol (PDCP) layer), and the like. The data transmission/reception unit 260 executes data error correction and retransmission control based on Hybrid automatic repeat request (ARQ).

The control unit 270 controls each functional block of the UE 200. Specifically, in the present embodiment, the control unit 270 executes control regarding DMRS reception and processing.

Specifically, the control unit 270 can change the control regarding DMRS reception and processing according to the frequency band used by the UE 200 or the size (width) of the subcarrier spacing (SCS).

More specifically, the control unit 270 can change the DMRS reception and processing specified in 3GPP Release-15 and Release-16, when a different frequency band (for example, FR2x (52.6 GHz to 71 GHZ), see FIG. 2) differing from a frequency band including one or a plurality of frequency ranges (FR1, FR2, for example).

Further, the control unit 270 can change the DMRS reception and processing specified in 3GPP Release-15 and Release-16, when SCS wider than that in the case of using the frequency band including FR1 and FR2 is applied (hereinafter, referred to as wider SCS application). Examples of the SCS wider than that in the case of using FR1 and FR2 include 480 kHz and 960 kHz. It should be noted that the SCS applied when using FR2x may be wider than the SCS applied when using FR1 and FR2, and is not necessarily limited to 480 kHz, 960 kHz, and the like.

The control unit 270 may assume that in the case when the different frequency band is used and/or when the wider SCS is applied, the DMRS is more aggregated in the frequency direction than in the case where the frequency band including FR1 and FR2 is used.

Specifically, the control unit 270 may assume that a DMRS sequence uses more RBs (which may also be regarded as subcarriers) than in the case where the frequency band including FR1 and FR2 is used. More specifically, the control unit 270 may assume that a plurality sequences 300 using different ports are aggregated into a single integrated sequence 300.

Furthermore, the control unit 270 may assume that the DMRS is expanded in at least one of the time direction and the space direction as compared with the case of using the frequency band including FR1 and FR2. Specifically, the control unit 270 may assume that a DMRS in which the sequences 300 are aggregated in the frequency direction and the sequence 300 is expanded in the time direction and/or the space direction as described above.

Alternatively, the control unit 270 may assume that in the case when the different frequency band is applied and/or when the wide SCS is applied, a DMRS includes a first portion and a second portion in which the sequences 300 are dispersed at a plurality of positions in the time direction as illustrated in FIG. 6A and FIG. 6B.

In this case, the control unit 270 may assume that the same positions of the first portion and the second portion in the frequency direction (RB, subcarrier) are associated with different ports. For example, when a predetermined position of the first portion in the frequency direction is associated with a port 1000, the control unit 270 can assume that the predetermined position of the second portion in the frequency direction is associated with a port (port 1001 for example) different from the port 1000. A specific example of such a DMRS sequence 300 will be further described later.

Furthermore, the control unit 270 may assume that in the case when the different frequency band is used and/or when the wide SCS is applied, the Zadoff-Chu sequence is used in at least a part of the DMRS.

Specifically, the control unit 270 may assume that in at least a part of the DMRS sequences 300, a pseudo noise (PN) sequence is replaced by the Zadoff-Chu sequence.

In this case, the control unit 270 may assume that different ports are alternately associated in the resource block (RB) allocated with the DMRS using the Zadoff-Chu sequence. For example, the control unit 270 may assume that a port n (for example, the port 1000) and a port n+1 (for example, the port 1001) are alternately associated in the RB. Note that a specific example of such a DMRS sequence 300 will also be described later.

(3) Operation of Radio Communication System

Next, the operation of the radio communication system 10 will be described. Specifically, an operation related to DMRS transmission/reception between the network (NG-RAN 20) and the UE 200 will be described.

(3.1) Background and Task

As described above, bandwidths of SCS and CC, CP length, Modulation and Coding Scheme (MCS) and the like are under study in a Work Item (WI) related to NR supporting frequencies exceeding 52.6 GHZ and up to 71 GHZ.

Specifically, the changes illustrated in Table 1 are under evaluation.

TABLE 1

| | NR | Change candidate |
| --- | --- | --- |
| Subcarrier Spacing (SCS) | Up to 240 kHz (for SSB) | 240, 480, 960 or 1920 kHz |
| CC Bandwidth | 400 MHz | 800 MHz and others |
| CP length | Scaling with SCS | Extended CP |
| MCS | Up to 0.926 code rate w/ 64-QAM or 256-QAM | No support for high coding rates |

As described above, with 3GPP Release-15 and Release-16 two types of DMRS (Type 1 and Type 2) are supported as described above. The characteristics of the Type 1 DMRS and the Type 2 DMRS are as follows.

Type 1 (FD Comb 2+2 CS+TD-OCC, see FIGS. 5A and 5B)

Supporting a maximum of four signals (single-symbol) or eight signals (double-symbol)

Equivalent density in frequency domain: two subcarriers/ports

Type 2 (FD-OCC+TD-OCC+FDM, see FIGS. 6A and 6B)

Supporting a maximum of six signals (single-symbol) or 12 signals (double-symbol)

Equivalent density in frequency domain: six subcarriers/ports

Figure 7:
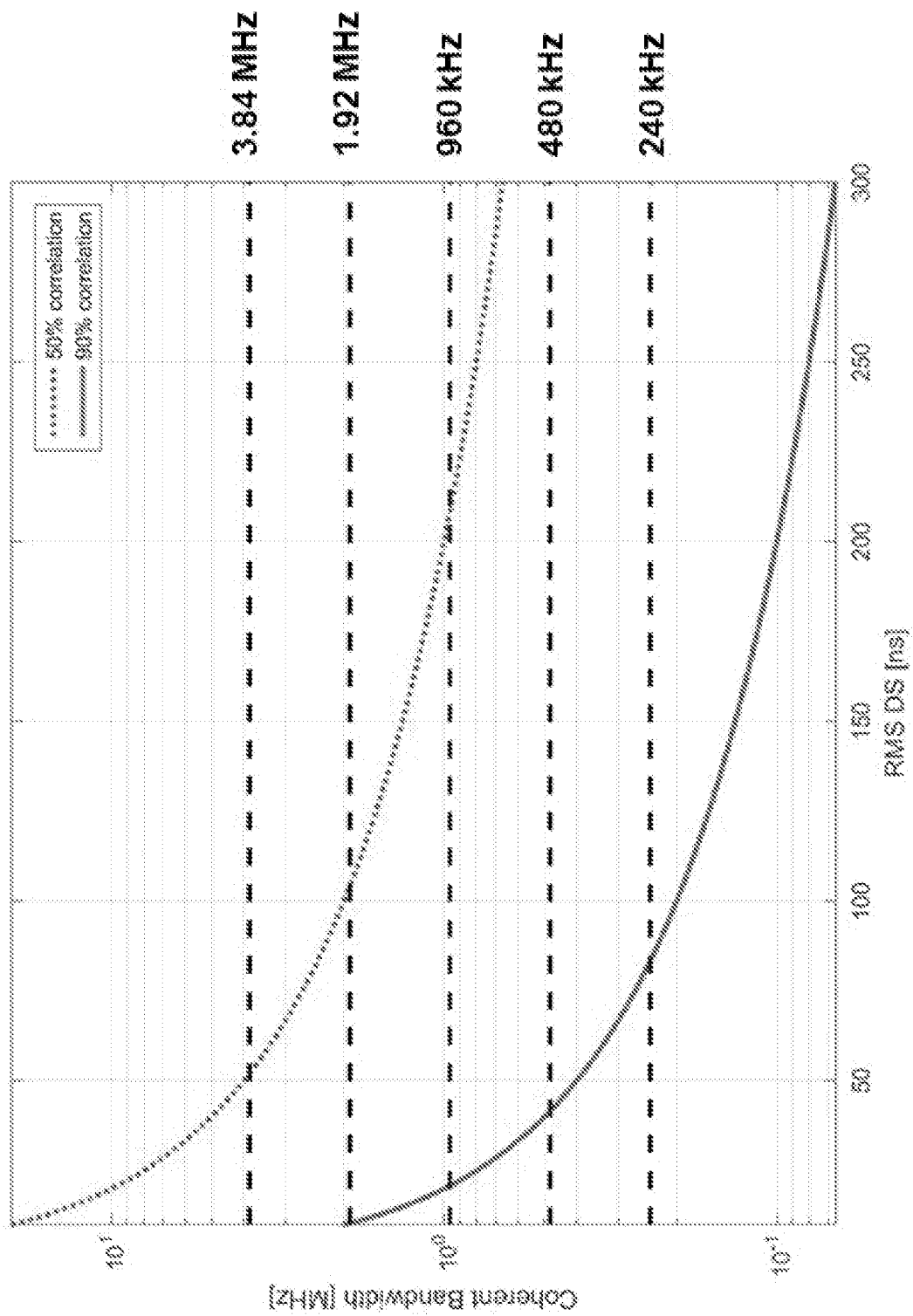
FIG. 7 is a diagram illustrating an example of the relationship between channel coherent bandwidth and delay spread.

FIG. 7 illustrates an example of the relationship between channel coherent bandwidth and delay spread. As illustrated in FIG. 7, the channel coherent bandwidth decreases as the delay spread (root-mean-square delay spread (RMS DS)) increases.

The expanded wide SCS as illustrated in Table 1 is equivalent to the channel coherent bandwidth in a typical scenario in the 70 GHz band such as FR2x. This may compromise the channel estimation performance based on the mapping density of the DMRS as specified in 3GPP Release-15 and Release-16.

In particular, time division multiplexing (including FDM and comb) and Frequency Division-Orthogonal Cover Code (FD-OCC) may result in the performance being significantly compromised under such a condition.

Figure 8:
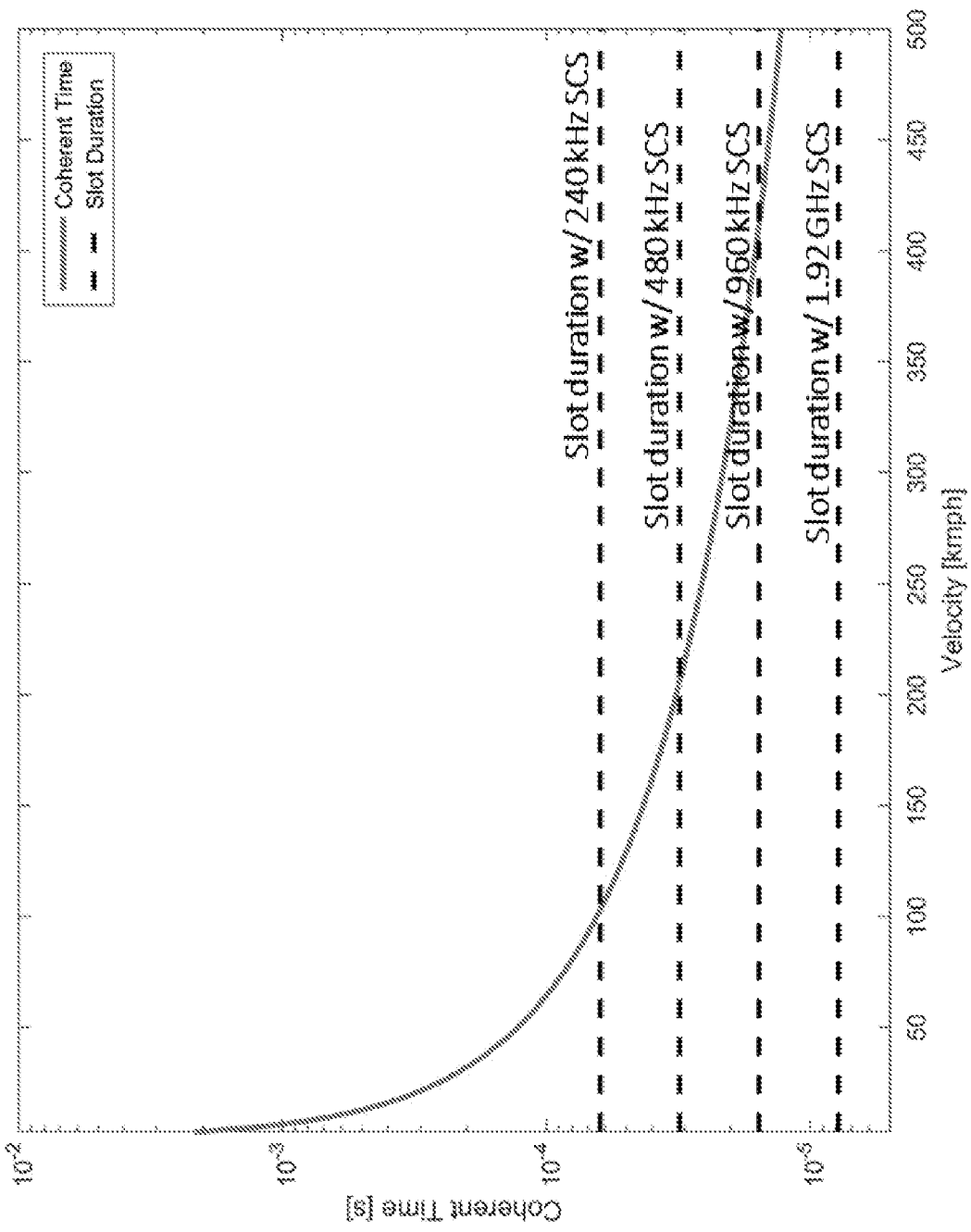
FIG. 8 is a diagram illustrating an example of the relationship between channel coherent bandwidth and moving speed of a terminal.

FIG. 8 illustrates an example of the relationship between channel coherent bandwidth and moving speed of a terminal. As illustrated in FIG. 8, an expanded wide SCS is required to support high moving speed.

For example, a 480 kHz SCS may be supported by using additional DMRS symbols (sequences 300, see FIGS. 6A and 6B).

Based on channel coherence time, only front-loaded DMRS (see FIGS. 5A and 5B) may be used for an SCS equal to or larger than 960 kHz.

Note that time domain multiplexing (such as inter-symbol TD-OCC) is still promising in many scenarios.

Thus, when a high frequency band such as FR2x is used, a larger SCS is required, and the expanded wide SCS is comparable to the channel coherent bandwidth, as described above. Considering such a situation, the DMRS is preferably expanded in the frequency domain, so that the channel estimation performance can be prevented from being compromised.

Hereinafter, an operation example related to the configuration and processing of a DMRS will be described. The operation is based on the characteristics of FR2x in a high frequency band as described above.

(3.2) Operation Example

In this operation example, a DMRS having the following features is configured under the assumption that a high frequency band such as FR2x is used.
- (Frequency domain density): two subcarriers/ports or less, and thus one subcarrier/port may be supported. FD-OCC may not be supported. That is, a DMRS sequence may be mapped with density higher than that specified in 3GPP Release-15 and Release-16.
- (Number of ports): The number of ports supported is two, four, or the like to be less than that specified in 3GPP Release-15 and Release-16, for the sake of Space Division Multiplexing (SDM) performance.
- (Relationship with DMRS for FR1/FR2): Secure commonality with DMRS for FR1/FR2 as much as possible.
- (PAPR): Take low Peak-to-Average Power Ratio (PAPR) into consideration.

(3.2.1) Operation Example 1

In this operation example, the UE 200 assumes that ports (antenna ports) used for generating DMRSs in the network (specifically, gNB) are aggregated.

Specifically, port aggregation may be supported while still complying with the DMRS "comb" structure. More specifically, ports may be aggregated while using the comb 2 structure. In the comb structure, a DMRS is transmitted for every Nth subcarrier, where N may be a value of 2, for example (comb 2 structure).

The DMRS according to this operation example may be based on Type 1 DMRS. Specifically, two ports having different combs may be aggregated into a single port.

The network (NG-RAN 20) may notify the UE 200 of the DMRS aggregation.

Figure 9:
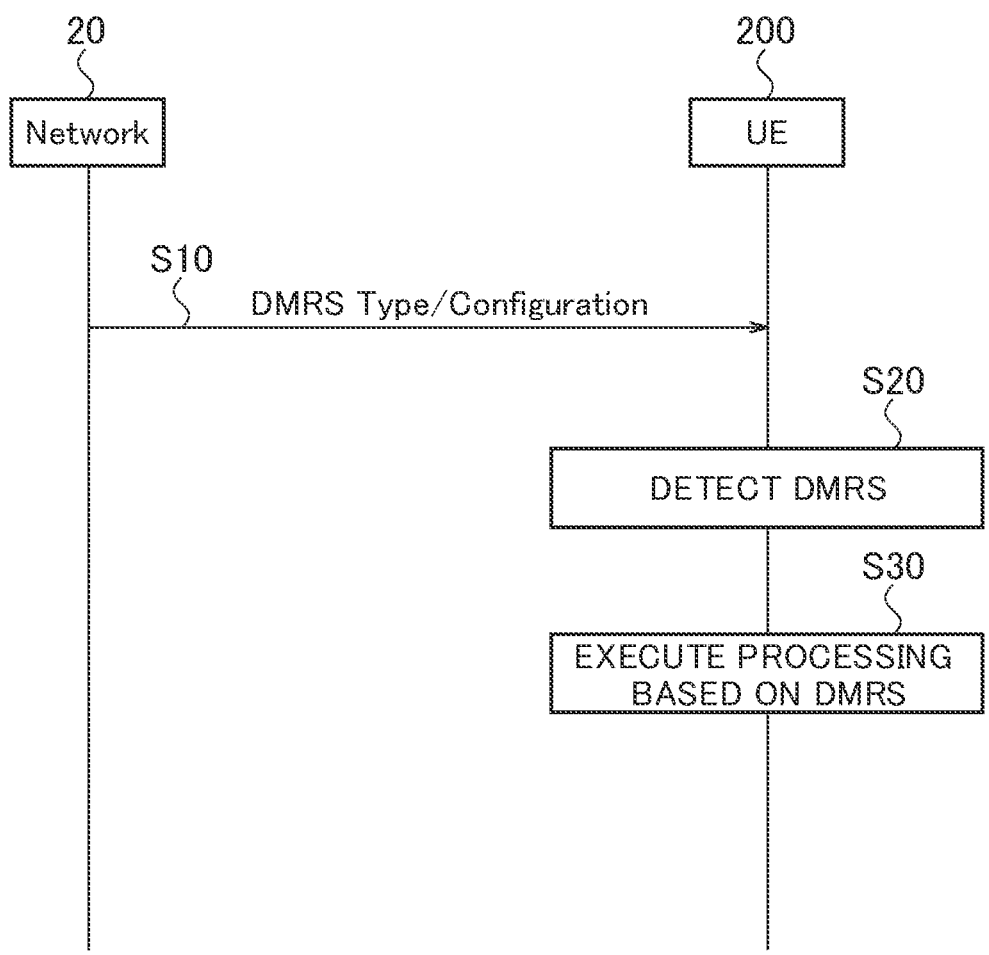
FIG. 9 is a diagram illustrating an example of a sequence related to notification, detection, and the like of a DMRS type according to Operation Example 1.

FIG. 9 illustrates an example of a sequence related to notification, detection, and the like of the DMRS type according to Operation Example 1. As illustrated in FIG. 9, the network (specifically, a gNB) can notify the UE 200 of the type and/or configuration information about the DMRS transmitted from the network (S10).

Note that the notification may be performed by any of the following ways.

(Alt. 1): Notify as new DMRS For example, the information may be notified to indicate a DMRS that replaces the existing Type 2 DMRS (that is, a new Type 2), or may be notified as a new Type 3 DMRS. The notification is issued through RRC layer signaling.

(Alt. 2): Same as Alt. 1 except that MAC Control Element (CE) or downlink control information (DCI) is used for the notification.

The UE 200 attempts to detect the aggregated DMRS based on the content of the RRC layer signaling, MAC CE, or DCI (S20).

The UE 200 executes processing based on the detected DMRS (S30). Specifically, the UE 200 implements PDSCH reception setting and the like based on the detected DMRS.

FIG. 10 illustrates a configuration example of DMRS aggregation according to Operation Example 1. The upper part of FIG. 10 illustrates a configuration example before DMRS aggregation, and the lower part in the figure illustrates a configuration example after DMRS aggregation.

FIG. 10 illustrates an example of a single-symbol front-loaded DMRS. Specifically, the upper part of FIG. 10 illustrates a 4-port structure generated by the comb 2 structure and 2 Cyclic Shift (CS) (see four types of hatching for CS1 and CS2 in the figure).

The DMRS sequence 300 after DMRS aggregation is the same as the DMRS sequence 300 before DMRS aggregation. The lower part of FIG. 10 illustrates a 2 port configuration generated by 2 CS (see two types of hatching of CS1 and CS2 in the figure).

(3.2.2) Operation Example 2

In this operation example, the UE 200 assumes a DMRS with high frequency division (FD) density. Differences from the Operation Example 1 will be mainly described below. Specifically, the UE 200 may be notified of the information about the DMRS type and/or configuration in a manner that is the same as that in Operation Example 1.

The high FD density DMRS may be defined (notified) as a DMRS that replaces the existing Type 2 DMRS or may be defined (notified) as a new Type 3 DMRS, as in Operation Example 1.

Figure 11A:
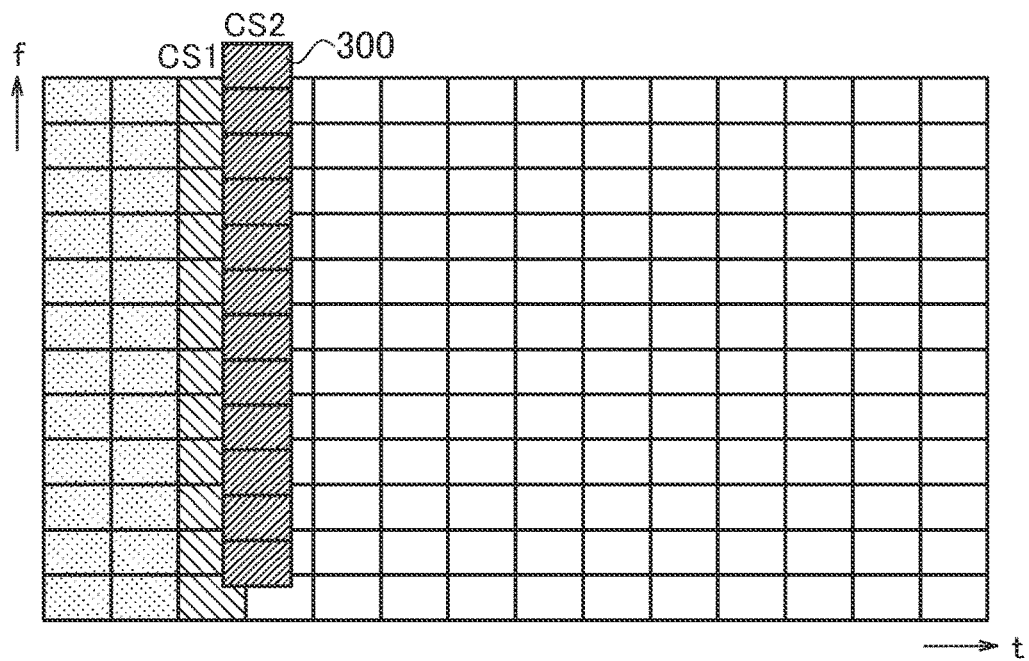
FIG. 11A is a diagram illustrating a pattern of a high FD density DMRS according to Operation Example 2.
Figure 11B:
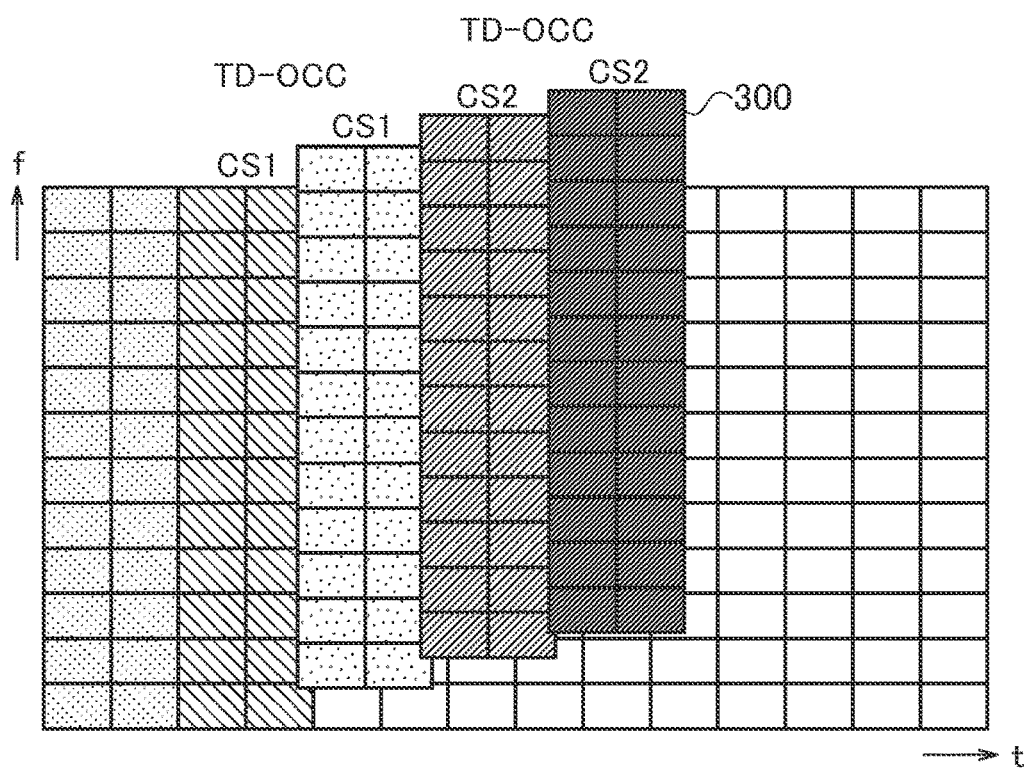
FIG. 11B is a diagram illustrating a pattern of the high FD density DMRS according to Operation Example 2.

FIG. 11A and FIG. 11B are diagrams illustrating patterns of the high FD density DMRS according to Operation Example 2. FIG. 11A illustrates an example of a DMRS pattern of normal density, which is similar to the DMRS sequence 300 illustrated in the lower part of FIG. 10. In other words, FIG. 11A illustrates a single-symbol front-loaded DMRS and a 2-port configuration.

In this operation example, the maximum of two layers (in a case of single-symbol) or of four layers (in a case of double-symbol) may be supported to achieve high FD density, that is, high DMRS density in the frequency direction. Also, CS and TD-OCC may be based on Type 1 DMRS.

Specifically, FIG. 11B illustrates a double-symbol front-loaded DMRS and a 4-port configuration (see four types of hatching of CS1 and CS2 in the figure).

FIG. 12 illustrates details of the DMRS pattern illustrated in FIG. 11A. As illustrated in FIG. 12, the two ports (1000 and 1001) use two different CSs (CS1, CS2) defined as $w_f(k')$.

The formula for the DMRS mapping specified in Section 7.4.1.1.2 of 3GPP TS38.211 may be modified as follows.

$$a_{k,l}^{(p,u)} = B_{PDSCH}^{DMRS} w_f(k') w_t(l') r(2n+k')$$

$$k = 2n + k' + \Delta$$

$$k' = 0,1$$

$$l = \bar{l} + l'$$

$$n = 0,1,$$ [Formula 1]

FIG. 13 illustrates details of the DMRS pattern illustrated in FIG. 11B. As illustrated in FIG. 13, the four ports (1000, 1001, 1002, and 1003) use two different TD-OCCs in the time domain and two different CSs (CS1 and CS2 defined as $w_f(k')$) in combination.

Also in this case, the formula for DMRS mapping specified in Chapter 7.4.1.1.2 of 3GPP TS38.211 may be modified as in (Formula 1).

(3.2.3) Operation Example 3

In this operation example, the UE 200 assumes a comb-like DMRS added so that the DMRS sequence is dispersed in the time domain in the slot. Differences from the Operation Example 1 will be mainly described below.

Figure 14A:
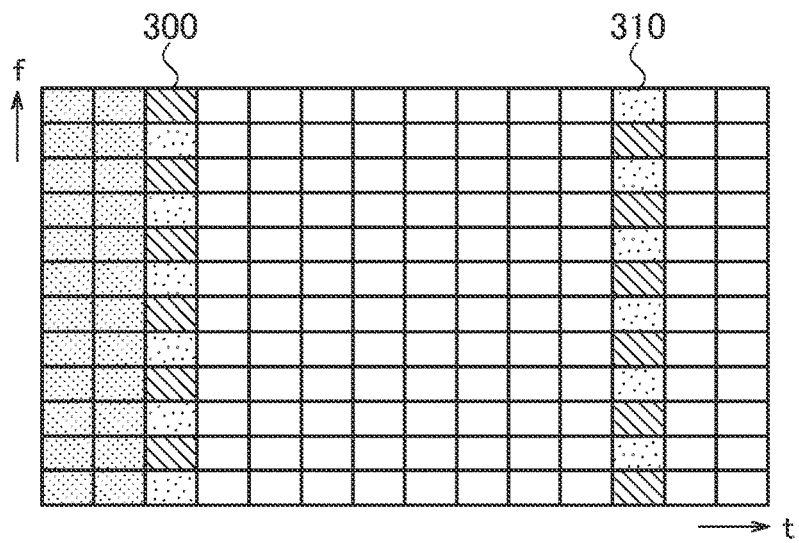
FIG. 14A is a diagram illustrating a configuration example (No. 1) of an additional DMRS according to Operation Example 3.
Figure 14B:
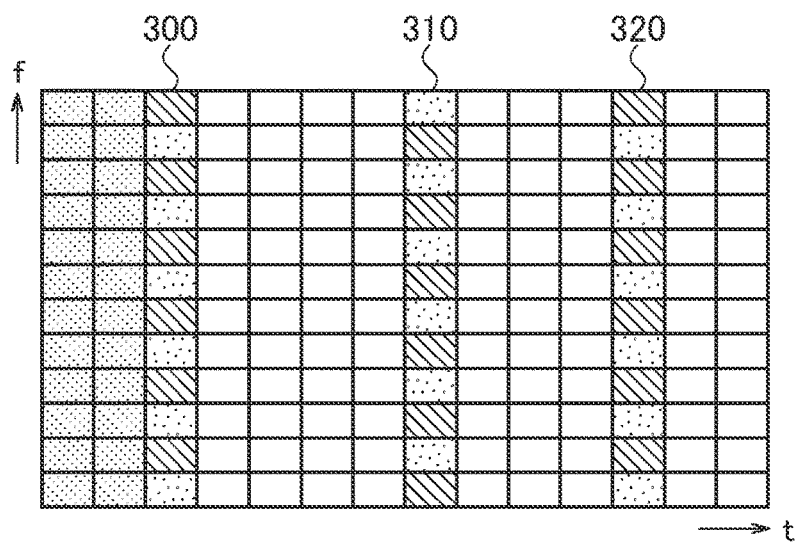
FIG. 14B is a diagram illustrating a configuration example (No. 2) of an additional DMRS according to Operation Example 3.
Figure 14C:
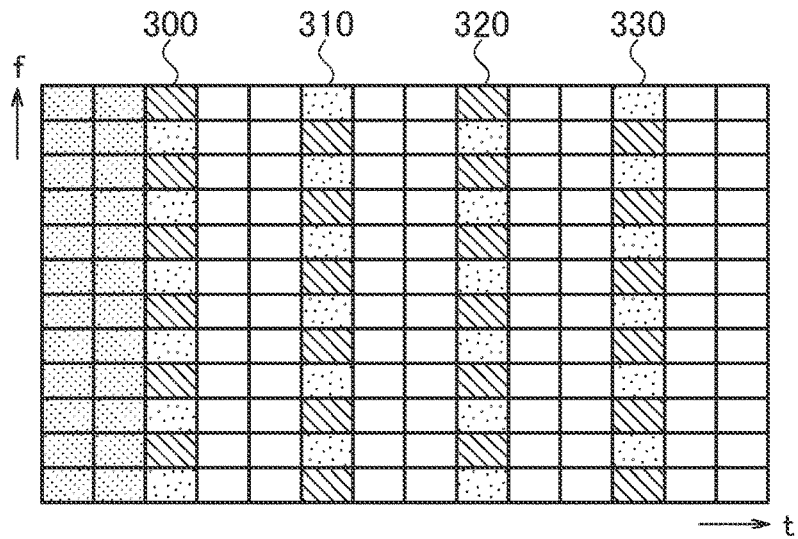
FIG. 14C is a diagram illustrating a configuration example (No. 3) of an additional DMRS according to Operation Example 3.

FIGS. 14A, 14B, and 14C illustrate Configuration Examples (No. 1 to No. 3) of the additional DMRS according to the operation example 3. FIGS. 14A, 14B, and 14C illustrate examples in which two DMRS ports with different CSs (see hatching of sequences 300, 310, 320, and 330 in the figure) are used.

As illustrated in FIGS. 14A, 14B, and 14C, when sequences 310, 320, and 330 are added in addition to the front-loaded sequence 300, the additional sequences are comb-shaped, that is, spaced to form the shape of a comb in the time domain.

Furthermore, to achieve a higher density in the frequency domain with these addition DMRSs, the front-loaded sequence 300 and the adjacent sequence 310 in the time domain may be mapped to different ports to form a comb shape in the frequency domain, for example.

Specifically, at the same position (the same subcarrier or RB) in the direction f in the figure, the sequence 300 and the sequence 310 are associated with different ports (see the hatching). The sequence 310 and the sequence 320, and the sequence 320 and the sequence 330 may also be mapped to different ports, as in the case of the sequence 300 and the sequence 310.

In other words, the UE 200 may assume that the same positions of the sequence 300 (first portion) and the sequence 310 (second portion) in the frequency direction (RB, subcarrier) are associated with different ports.

(3.2.4) Operation Example 4

Figure 15:
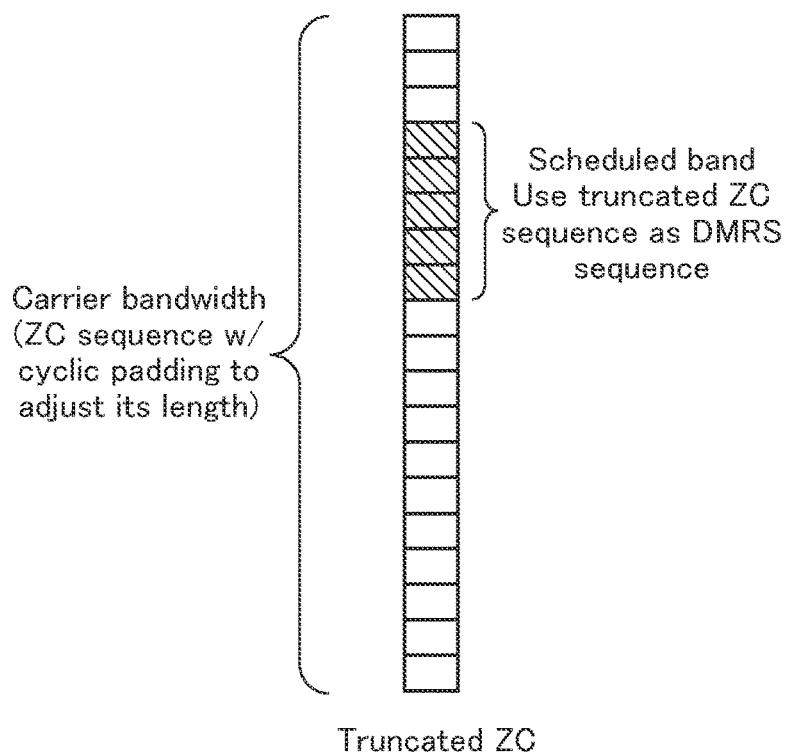
FIG. 15 is a diagram illustrating a configuration example (No. 1) of a DMRS using a Zadoff-Chu sequence according to Operation Example 4.
Figure 16:
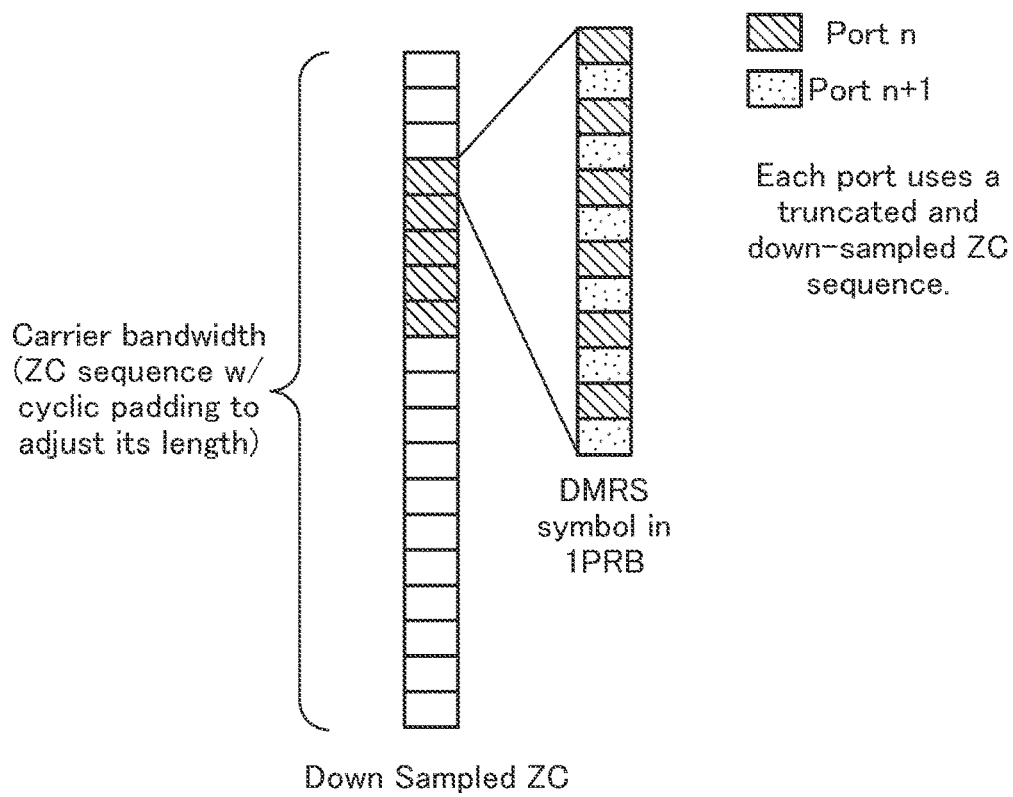
FIG. 16 is a diagram illustrating a configuration example (No. 2) of the DMRS using the Zadoff-Chu sequence according to Operation Example 4.

In this operation example, the UE 200 assumes a DMRS with the Zadoff-Chu sequence at least partially used. FIG. 15 illustrates a configuration example (No. 1) of the DMRS using the Zadoff-Chu sequence according to Operation Example 4. FIG. 16 illustrates a configuration example (No. 2) of the DMRS using the Zadoff-Chu sequence according to Operation Example 4.

The DMRS using the Zadoff-Chu sequence (ZC sequence) may achieve a lower PAPR. The vertical direction in FIGS. 15 and 16 indicates the carrier bandwidth, and one rectangle may correspond to a Physical Resource Block (PRB). The ZC sequence may also include cyclic padding for adjusting the sequence length.

In this operation example, in order to achieve a low PAPR of the DMRS, a truncated ZC sequence as a result of partially truncating the normal ZC sequence may be used instead of the pseudo noise (PN) sequence. For example, as illustrated in FIG. 15, the truncated ZC sequence may be used as the DMRS sequence in a scheduled band.

Furthermore, as illustrated in FIG. 16, when using the comb structure, a ZC sequence (which may also be referred to as a truncated and down-sampled ZC sequence) as a result of truncating thereof and reducing the information amount (down-sampled).

In this case, each port can use the truncated and down-sampled ZC sequence, as illustrated in FIG. 16.

More specifically, in FIG. 16, 5×PRB (that is, 60 subcarriers) is assigned to the ZC sequence, and within one PRB, different ports (port n (for example, the port 1000) and port n+1 (for example, the port 1001)) are alternately associated in the frequency direction.

(4) Advantageous Effect of Invention

According to the above-described embodiment, the following advantageous effects can be obtained. The UE 200 can assume that in the case when the different frequency band is used and/or when the wide SCS is applied, the more DMRSs are aggregated in the frequency direction than in the case where the frequency band including FR1 and FR2 is used.

Thus, even when a high frequency band such as FR2x is used that involves a large SCS, the UE 200 may receive the DMRS that supports such an SCS while having commonality with the DMRS corresponding to an SCS for existing frequency band.

Specifically, the DMRSs aggregated in the frequency direction is based on the design with the DMRS corresponding to the SCS for the existing frequency band, meaning that the DMRS as specified in 3GPP Release-15 and Release-16 is not largely affected.

In the present embodiment, the UE 200 may assume that a DMRS in which the sequences 300 are aggregated in the frequency direction and the sequence 300 is expanded in the time direction and/or the space direction as described above.

Furthermore, in the present embodiment, the UE 200 can assume a DMRS including a first portion and a second portion with the sequences 300 dispersed at a plurality of positions in the time direction as illustrated in FIGS. 6A and 6B, and can also assume that the same positions of the first portion and the second portion in the frequency direction (RB, subcarrier) are associated with different ports.

Thus, the UE 200 can receive a DMRS having higher FD density while having commonality with the DMRS corresponding to the SCS for the existing frequency band. This can improve the radio communication quality in a high frequency band such as FR2x.

In the present embodiment, the UE 200 may assume that different ports are alternately associated in the resource block (RB) allocated with the DMRS using the Zadoff-Chu sequence. According to the DMRS having such a configuration, the Zadoff-Chu sequence is used so that a lower PAPR can be expected to be achieved, whereby a radio communication quality may be improved in a high frequency band such as FR2x and the like.

(5) Other Embodiments

Although the embodiment has been described above, it is obvious to those skilled in the art that the invention is not limited to the description of the embodiment and various modifications and improvements can be made.

For example, in the above-described embodiment, an example of using a DMRS of a new configuration when using a different frequency band and/or a wide SCS has been described. It should be noted that the DMRS configuration as described above may be also used when using the different frequency band, even in the case where the same SCS as FR1 and FR2 is applied.

On the contrary, the DMRS configuration as described above may also be used under a condition where the FR1, FR2 is employed with the SCS being as wide as 240, 480, or 960 kHz.

Further, in the above-described embodiment, the description has been given for a DMRS for a PDSCH, but may be applies to other DMRSs (such as that for a PUSCH (uplink)).

Furthermore, FR2x may be divided into a frequency range of 70 GHz or less and a frequency range of 70 GHz or more, and any of the operation examples described above may be partially applied to the frequency range of 70 GHz or more and the frequency range of 70 GHz or less.

Moreover, the block diagram used for explaining the embodiments (FIG. 4) illustrates blocks of functional unit. Those functional blocks (structural components) can be realized by a desired combination of at least one of hardware and software. A realization method of each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (structural component) that causes transmitting may be referred to as a transmitting unit or a transmitter. For any of the above, as explained above, the realization method is not particularly limited to any one method.

Figure 17:
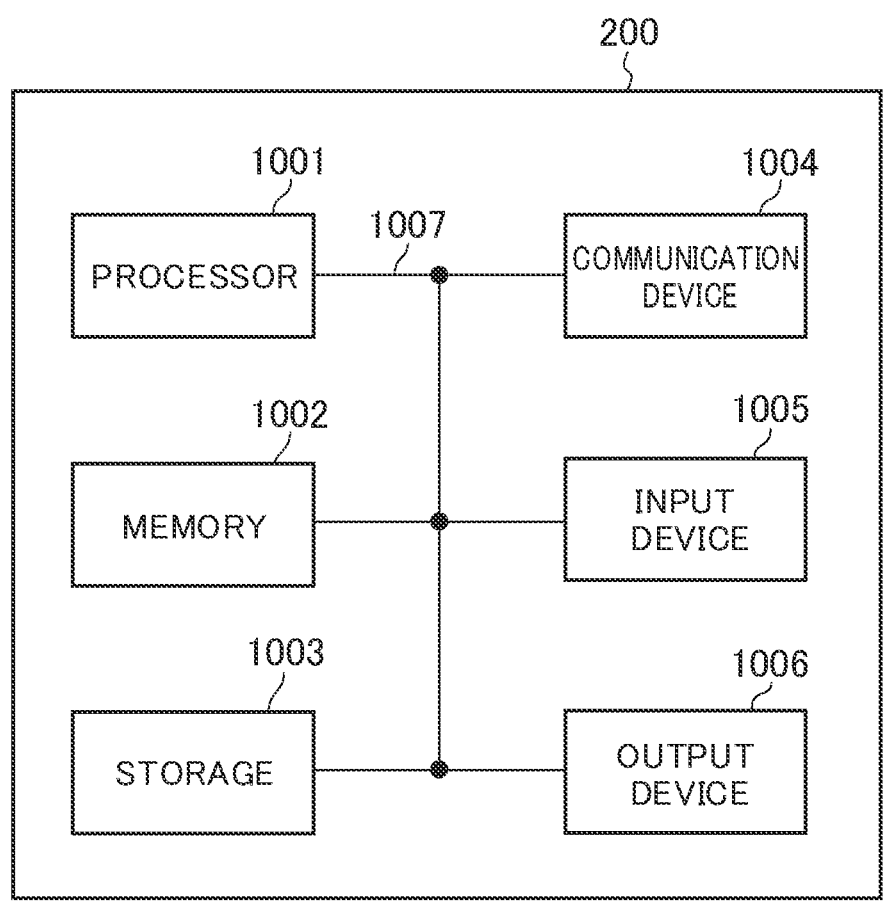
FIG. 17 is a diagram illustrating an example of a hardware configuration of the UE 200.

Furthermore, the UE 200 explained above can function as a computer that performs the processing of the radio communication method of the present disclosure. FIG. 17 is a diagram illustrating an example of a hardware configuration of the UE 200. As illustrated in FIG. 17, the UE 200 can be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices illustrated in the figure, or can be constituted by without including a part of the devices.

The functional blocks (see FIG. 4) of the UE 200 can be realized by any of hardware elements of the computer device or a desired combination of the hardware elements.

Moreover, the processor 1001 performs computing by loading a predetermined software (computer program) on hardware such as the processor 1001 and the memory 1002, and realizes various functions of the UE 200 by controlling communication via the communication device 1004, and controlling at least one of reading and/or writing of data on the memory 1002 and the storage 1003.

The processor 1001, for example, operates an operating system to control the entire computer. The processor 1001 can be configured with a central processing unit (CPU) including an interface with a peripheral device, a control device, a computing device, a register, and the like.

Moreover, the processor 1001 reads a computer program (computer program code), a software module, data, and the like from at least one of the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 can be referred to as register, cache, main memory (main memory), and the like. The memory 1002 can store therein a computer program (computer program codes), software modules, and the like that can execute the method according to the embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be referred to as an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also referred to as, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information thereamong. The bus 1007 can be configured by a single bus or can be constituted by separate buses between the devices.

Further, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Notification of information is not limited to that explained in the above aspect/embodiment, and may be performed by using a different method. For example, the notification of information may be performed by physical layer signaling (for example, Downlink Control Information (DCI), Uplink Control Information (UCI), upper layer signaling (for example, RRC signaling, Medium Access Control (MAC) signaling, notification information (Master Information Block (MIB), System Information Block (SIB)), other signals, or a combination of these. The RRC signaling may be referred to as RRC message, for example, or can be RRC Connection Setup message, RRC Connection Reconfiguration message, or the like.

Each of the above aspects/embodiments described in the present disclosure can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods explained in the present disclosure are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information and signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, computer program code, computer program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, optic fiber cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned in the present disclosure may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of a channel and a symbol may be a signal (signaling). Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be instructed by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also referred to as sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part of all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is referred to as by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be referred to as a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same). For example, each of the aspects/embodiments of the present disclosure may be applied to a configuration that allows a communication between a base station and a mobile station to be replaced with a communication between a plurality of mobile stations (for example, may be referred to as Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms such an uplink channel, a downlink channel, or the like may be read as a side channel.

Likewise, a mobile station in the present disclosure may be read as a base station. In this case, the base station may have the function of the mobile station.

A radio frame may be comprised of one or more frames in the time domain. Each of one or more frames in the time domain may be referred to as a subframe. Furthermore, a subframe may be comprised of one or multiple slots in the time domain. A subframe may be a fixed time duration (for example, 1 ms) not dependent on the numerology.

The numerology may be a communication parameter applied to at least one of transmission and reception of a certain signal or channel. For example, the numerology may indicate at least one of subcarrier spacing (SCS), bandwidth, symbol length, cyclic prefix length, transmission time interval (TTI), the number of symbols per TTI, radio frame configuration, a specific filtering process performed by a transceiver in the frequency domain, and a specific windowing process performed by the transceiver in the time domain, and the like.

A slot may be comprised of one or more symbols in the time domain (Orthogonal Frequency Division Multiplexing (OFDM)) symbols, Single Carrier Frequency Division Multiple Access (SC-FDMA) symbols, and so on). Also, a slot may be a time unit based on the numerology.

A slot may include a plurality of minislots. Each minislot may be comprised of one or more symbols in the time domain. Also, a minislot may be referred to as a subslot. Minislots may be composed of fewer symbols than slots. PDSCH (or PUSCH) transmitted in a time unit larger than a minislot may be referred to as PDSCH (or PUSCH) mapping type A. PDSCH (or PUSCH) transmitted using a minislot may be referred to as PDSCH (or PUSCH) mapping type B.

A radio frame, a subframe, a slot, a minislot, and a symbol all represent a time unit in signal communication. A radio frame, a subframe, a slot, a minislot, and a symbol may be each referred to as by other applicable names.

For example, one subframe may be referred to as a transmission time interval (TTI), or a plurality of consecutive subframes may be referred to as a TTI, or one slot or one minislot may be referred to as a TTI. That is, at least one of a subframe and a TTI may be a subframe (1 ms) in the existing LTE, may be a shorter period of time than 1 ms (for example, one to thirteen symbols), or may be a longer period of time than 1 ms. Note that the unit to represent a TTI may be referred to as a slot, a minislot, and so on, instead of a subframe.

Here, a TTI refers to the minimum time unit of scheduling in radio communication, for example. For example, in LTE systems, a base station schedules the radio resources (such as the frequency bandwidth and transmission power that can be used in each user terminal) to allocate to each user terminal in TTI units. Note that the definition of TTIs is not limited to this.

The TTI may be a transmission time unit of channel-encoded data packets (transport blocks), code blocks, codewords, or the like, or may be a unit of processing in scheduling, link adaptation, and so on. Note that, when a TTI is given, the period of time (for example, the number of symbols) in which transport blocks, code blocks, codewords, or the like are actually mapped may be shorter than the TTI.

Note that, when one slot or one minislot is referred to as a TTI, one or more TTIs (that is, one or more slots or one or more minislots) may be the minimum time unit of scheduling. Also, the number of slots (the number of minislots) to constitute this minimum time unit of scheduling may be controlled.

A TTI having a time duration of 1 ms may be referred to as a general TTI (TTI in LTE Rel. 8 to 12), a normal TTI, a long TTI, a general subframe, a normal subframe, a long subframe, a slot, and so on. A TTI that is shorter than a general TTI may be referred to as a shortened TTI, a short TTI, a partial TTI (or a fractional TTI), a shortened subframe, a short subframe, a minislot, a subslot, a slot, and so on.

Note that a long TTI (for example, a general TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. The number of subcarriers included in the RB may be the same regardless of the numerology, and may be, for example, 12. The number of subcarriers included in the RB may be determined based on the numerology.

Also, the time domain of the RB may include one or more symbols, and may be one slot, one minislot, one subframe, or one TTI in length. One TTI, one subframe, and the like may be each comprised of one or more resource blocks.

Note that one or more RBs may be referred to as a physical resource block (physical RB (PRB)), a subcarrier group (SCG), a resource element group (REG), a PRB pair, an RB pair, and so on.

Furthermore, a resource block may be comprised of one or more resource elements (REs). For example, one RE may be a radio resource field of one subcarrier and one symbol.

A bandwidth part (BWP) (which may be referred to as a partial bandwidth, or the like) may represent a subset of contiguous common resource blocks (common RBs) for a certain numerology in a certain carrier. Here, the common RBs may be specified by an RB index based on a common reference point of the carrier. A PRB may be defined in a BWP and numbered within the BWP.

The BWP may include a BWP for UL (UL BWP) and a BWP for DL (DL BWP). For a UE, one or more BWPs may be set within one carrier.

At least one of the configured BWPs may be active and the UE may not be assumed to transmit or receive any given signal/channel outside the active BWP. Note that "cell", "carrier", and the like in the present disclosure may be replaced with a "BWP".

Note that the structures of radio frames, subframes, slots, minislots, symbols, and so on described above are merely examples. For example, configurations pertaining to the number of subframes included in a radio frame, the number of slots per subframe or radio frame, the number of minislots included in a slot, the number of symbols and RBs included in a slot or a minislot, the number of subcarriers included in an RB, the number of symbols in a TTI, the symbol duration, the length of cyclic prefixes (CPS), and so on can be variously changed.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the radio frequency domain, the microwave domain and light (both visible and invisible) domains, and the like.

The reference signal may be abbreviated as Reference Signal (RS) and may be referred to as pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each of the above devices may be replaced with "unit", "circuit", "device", and the like.

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout the present disclosure, for example, during translation, if articles such as "a", "an", and "the" in English are added, in this disclosure, these articles shall include plurality of nouns following these articles.

The term "determining" as used in the present disclosure may encompass a wide variety of operations. Examples of "determining" may include cases where judging, calculating, computing, processing, deriving, investigating, looking up, search, inquiry (e.g., searching a table, a database, or another data structure), and ascertaining are considered to be "determined". Furthermore, "determining" may include cases where receiving (for example, receiving information), transmitting (for example, transmitting information), input, output, and accessing (for example, accessing data in a memory) are considered to be "determined". In addition, "determining" may include cases where resolving, selecting, choosing, establishing, and comparing are considered to be "determined". In other words, "determining" may include cases where of some operation is considered to be "determined". The term "determining" may be replaced with "assuming", "expecting", "considering", or the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

REFERENCE SIGNS LIST

10 Radio communication system
20 NG-RAN
100A, 100B gNB
UE 200
210 Radio signal transmission/reception unit
220 Amplifier unit
230 Modulation/demodulation unit
240 Control signal/reference signal processing unit
250 Coding/decoding unit
260 Data transmission/reception unit
270 Control unit
300, 310, 320, 330 Sequence
1001 Processor
1002 Memory
1003 Storage
1004 Communication device
1005 Input device
1006 Output device
1007 Bus

The invention claimed is:

1. A terminal comprising:
a receiver configured to receive a demodulation reference signal from a network; and
a processor configured to assume the demodulation reference signal to be more aggregated in a frequency direction than in a case where a frequency band including one or a plurality of frequency ranges is used, when a different frequency band differing from the frequency band is used or when a wider subcarrier spacing is applied than the case where the frequency band is used,
wherein the plurality of frequency ranges includes a first frequency range of 410 MHz to 7.125 GHz and a second frequency range of 24.25 GHz to 52.6 GHz.

2. The terminal according to claim 1, wherein the processor assumes the demodulation reference signal to be more expanded in at least one of a time direction and a spatial direction than in the case where the frequency band is used.

3. A terminal comprising:
a receiver configured to receive a demodulation reference signal from a network; and
a processor configured to assume the demodulation reference signal to include a first portion and a second portion dispersed at a plurality of positions in a time direction, when a different frequency band differing from a frequency band including one or a plurality of frequency ranges is used or when a wider subcarrier spacing is applied than the case where the frequency band is used,
wherein
the processor assumes a same position of the first portion and the second portion in a frequency direction to be associated with different ports, and
the plurality of frequency ranges includes a first frequency range of 410 MHz to 7.125 GHz and a second frequency range of 24.25 GHz to 52.6 GHz.

4. A terminal comprising:
a receiver configured to receive a demodulation reference signal from a network; and
a processor configured to assume the demodulation reference signal having at least a part for which a Zadoff-Chu sequence is used, when a different frequency band differing from a frequency band including one or a plurality of frequency ranges is used or when a wider subcarrier spacing is applied than the case where the frequency band is used,
wherein
the processor assumes different ports to be alternately associated in a resource block allocated with the demodulation reference signal for which the Zadoff-Chu sequence is used, and
the plurality of frequency ranges includes a first frequency range of 410 MHz to 7.125 GHz and a second frequency range of 24.25 GHz to 52.6 GHz.

* * * * *